(12) United States Patent
Seufzer et al.

(10) Patent No.: US 9,764,415 B2
(45) Date of Patent: Sep. 19, 2017

(54) HEIGHT CONTROL AND DEPOSITION MEASUREMENT FOR THE ELECTRON BEAM FREE FORM FABRICATION (EBF3) PROCESS

(71) Applicant: U.S.A. as represented by the Administrator of the National Aeronautics and Space Administration, Washington, DC (US)

(72) Inventors: William J. Seufzer, Yorktown, VA (US); Robert A. Hafley, Yorktown, VA (US)

(73) Assignee: The United States of America as represented by the Administrator of NASA, Washington, DC (US)

(*) Notice: Subject to any disclaimer, the term of this patent is extended or adjusted under 35 U.S.C. 154(b) by 758 days.

(21) Appl. No.: 13/834,294

(22) Filed: Mar. 15, 2013

(65) Prior Publication Data
US 2015/0258626 A1     Sep. 17, 2015

(51) Int. Cl.
  *B23K 15/00*   (2006.01)
  *G06K 9/00*   (2006.01)
(52) U.S. Cl.
  CPC ...... *B23K 15/0013* (2013.01); *B23K 15/0086* (2013.01)
(58) Field of Classification Search
  USPC ............ 427/585; 204/192.11, 307, 310, 424; 118/663; 250/307, 306, 310, 311, 492.1, 250/492.3; 445/30; 318/640, 573, 574; 901/42; 219/121.64, 121.79
  See application file for complete search history.

(56) References Cited

U.S. PATENT DOCUMENTS

| | | | |
|---|---|---|---|
| 3,730,962 A * | 5/1973 | Norwalk | C23C 14/246 250/201.1 |
| 4,834,686 A * | 5/1989 | Kautz | H01J 9/142 219/121.64 |
| 4,900,695 A | 2/1990 | Takahashi et al. | |
| 5,994,659 A | 11/1999 | Offer | |
| 6,046,426 A | 4/2000 | Jeantette et al. | |
| 6,143,378 A | 11/2000 | Harwell et al. | |
| 6,145,470 A * | 11/2000 | Bruce | C23C 14/30 118/723 EB |
| 6,405,095 B1 | 6/2002 | Jang et al. | |
| 6,476,343 B2 | 11/2002 | Keicher et al. | |

(Continued)

*Primary Examiner* — David Angwin
*Assistant Examiner* — Gyounghyun Bae
(74) *Attorney, Agent, or Firm* — Jennifer L. Riley; Robin W. Edwards; Mark P. Dvorscak (57) ABSTRACT

A method of controlling a height of an electron beam gun and wire feeder during an electron freeform fabrication process includes utilizing a camera to generate an image of the molten pool of material. The image generated by the camera is utilized to determine a measured height of the electron beam gun relative to the surface of the molten pool. The method further includes ensuring that the measured height is within the range of acceptable heights of the electron beam gun relative to the surface of the molten pool. The present invention also provides for measuring a height of a solid metal deposit formed upon cooling of a molten pool. The height of a single point can be measured, or a plurality of points can be measured to provide 2D or 3D surface height measurements.

14 Claims, 3 Drawing Sheets

(56) References Cited

U.S. PATENT DOCUMENTS

| | | | |
|---|---|---|---|
| 6,509,568 B1 | 1/2003 | Ooae et al. | |
| 6,593,008 B2 | 7/2003 | Schmidt | |
| 6,667,486 B2 | 12/2003 | Sohda et al. | |
| 6,689,199 B2 * | 2/2004 | Corderman | C23C 14/16 106/1.05 |
| 6,710,296 B2 | 3/2004 | Siedal | |
| 6,727,459 B1 | 4/2004 | Bialach | |
| 6,813,533 B1 | 11/2004 | Semak | |
| 6,943,507 B2 | 9/2005 | Winkler et al. | |
| 6,995,334 B1 | 2/2006 | Kovacevic et al. | |
| 7,168,935 B1 * | 1/2007 | Taminger | B23K 15/0073 219/121.12 |
| 7,236,255 B2 * | 6/2007 | Kodama | B21C 37/0811 219/121.63 |
| 7,423,267 B2 * | 9/2008 | Nakasuji | B82Y 10/00 250/310 |
| 7,479,632 B1 * | 1/2009 | Gevelber | H01J 37/1475 250/306 |
| 8,344,281 B2 | 1/2013 | Taminger et al. | |
| 2002/0070672 A1 * | 6/2002 | Horsky | H01J 37/08 315/111.81 |
| 2003/0231304 A1 | 12/2003 | Chan et al. | |
| 2007/0141233 A1 * | 6/2007 | Schlichting | C23C 14/246 427/8 |
| 2010/0122901 A1 | 5/2010 | Weinstein et al. | |
| 2010/0260410 A1 * | 10/2010 | Taminger | H01J 37/304 382/141 |
| 2011/0061591 A1 * | 3/2011 | Stecker | B22F 3/1055 118/663 |
| 2012/0141693 A1 * | 6/2012 | Ward | B82Y 10/00 427/585 |
| 2013/0062324 A1 * | 3/2013 | Dorsch | B23K 26/032 219/121.63 |

* cited by examiner

HEIGHT CONTROL AND DEPOSITION MEASUREMENT FOR THE ELECTRON BEAM FREE FORM FABRICATION (EBF3) PROCESS

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Electron beam freeform fabrication (EBF$^3$) is a manufacturing deposition process in which an electron beam is used in conjunction with a wire feed to progressively deposit material onto a substrate in a layered manner. The electron beam is translated with respect to a surface of the substrate while the wire is melted and fed into a molten pool. In an EBF$^3$ process, a design drawing of a three-dimensional (3D) object can be sliced into different layers as a preparatory step, with the electron been tracing each of the various layers within a vacuum chamber. The layers ultimately cool into a desired complex or 3D shape.

Taminger U.S. Patent Publication No. 2010/0260410 discloses a closed-loop control method and apparatus for an electron beam freeform fabrication (EBF$^3$) process. The method of the '410 application can include use of one or more algorithms that are executed via a host machine of the apparatus set forth in the Taminger '410 application. The method uses a sensor or sensors to automatically detect or measure features of interest in the EBF$^3$ process, e.g., by imaging molten pool during the EBF$^3$ process. Detecting/measuring can be accomplished utilizing cameras, thermal sensors, and/or other suitable means. Sensor data describing the features of interest is fed into the host machine, which evaluates the sensor data to detect a magnitude/degree and/or a rate of change in the features of interest. The algorithm generates a feedback signal which is used by the host machine to modify a set of input parameters to the EBF$^3$ process.

The Taminger '410 application discloses a closed-loop control method for an EBF$^3$ process wherein a wire is melted and progressively deposited in layers onto a suitable substrate to form a complex product. The method includes detecting or measuring a feature of interest of the molten pool during the EBF$^3$ process using at least one sensor, continuously evaluating the feature of interest to determine, in real time, a change occurring therein, and automatically modifying a set of input parameters to the EBF$^3$ process to thereby control the EBF$^3$ process.

The Taminger '410 patent publication also discloses an apparatus that provides closed-loop control of the EBF$^3$ process, with the apparatus including an electron gun adapted for generating an electron beam, and a wire feeder for feeding a wire toward a substrate where the wire, once melted into a molten pool by the beam, is progressively deposited into layers onto the substrate. The apparatus also includes a host machine and at least one sensor. The sensors are adapted for detecting or measuring a feature of interest of a molten pool formed during the EBF$^3$ process, and the host machine executes one or more algorithms to continuously evaluate the feature of interest and determine, in real time, a change occurring therein. The host machine automatically modifies a set of input parameters to the EBF$^3$ process, i.e., by signaling a main process controller to change one or more of these parameters, to thereby control the EBF$^3$ process in a closed-loop manner.

As discussed in the Taminger '410 patent publication, a sensor in the form of a side-view optical camera can be used to monitor the height of a deposited bead on a substrate, and the distance between the deposited bead and the wire feeder. In such an embodiment, cross-hairs may be superimposed over the optical image, with the z-height of the deposit adjusted up or down to maintain the height of the current deposited layer centered on the cross-hairs.

During known EBF$^3$ processes, a human operator sets the height of the electron beam gun relative to the substrate. To initiate the start of a new layer the operator estimates visually where the wire should be in reference to the height of the previous deposit. If, because of a had estimation or a love spot in the previous layer, the feed height becomes too high, drips can result and the operator must input a command to lower the height of the electron beam gun and wire feeder. If the estimation is too low the feed wire can scrape against the previous deposit and can be forced out of the molten pool. In some cases, the misaligned wire can fuse with the previous deposit near the molten pool and cause a "wire stick." In that case the deposition process must be halted so that the wire can be cut away from the deposition.

BRIEF SUMMARY OF THE INVENTION

One aspect of the present disclosure is a method of controlling a height of an electron beam gun and wire feeder during deposition of layers of molten matter onto a substrate in an electron beam freeform fabrication process. The molten pool has a surface at an actual distance from the electron beam gun. The method further includes utilizing a camera to generate an image of the molten pool of material. A range of acceptable heights of the electron beam gun is determined, and the image generated by the camera is utilized to determine a measured height of the electron beam gun relative to the surface of the molten pool. The method further includes ensuring that the measured height is within the range of acceptable heights of the electron beam gun relative to the surface of the molten pool.

These and other features, advantages, and objects of the present invention will be further understood and appreciated by those skilled in the art by reference to the following specification, claims, and appended drawings.

DETAILED DESCRIPTION

Figure 1:
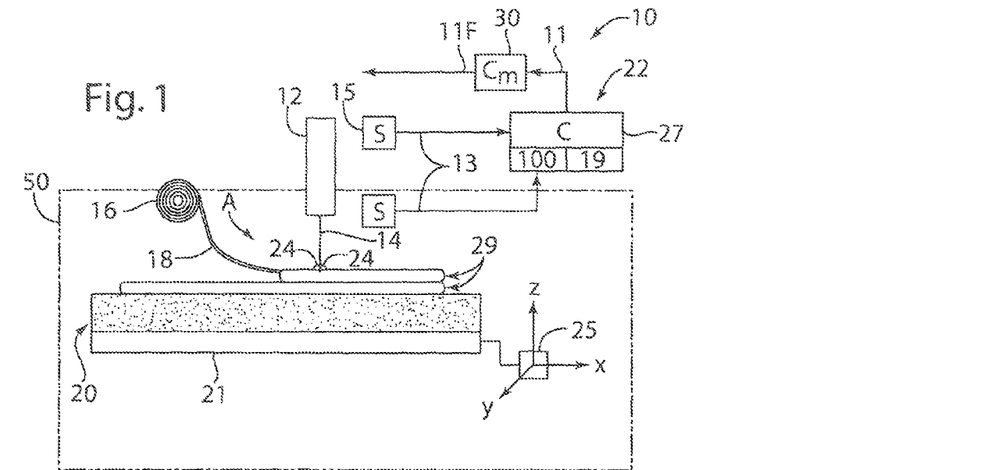
FIG. 1 is a schematic view of an electron beam freeform (EBF$^3$) apparatus according to one aspect of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention can assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An apparatus 10 (FIG. 1) of the type described in more detail in U.S. Patent Publication No. 2010/0260410, and U.S. Pat. No. 7,168,935 the contents of each being incorporated, by reference in their entirety, is configured for use in an electron beam freeform fabrication process, hereinafter abbreviated as $EBF^3$ for simplicity. An example of an $EBF^3$ process to which the present disclosure could be applied is also described and claimed in U.S. Pat. No. 7,168,935. As will be understood by those of ordinary skill in the art, an $EBF^3$ process allows a complex object, e.g., a vehicle, aircraft, or spacecraft component, to be formed in a progressive or layered manner using an electron beam 14. The apparatus 10 is used with an $EBF^3$ process, and includes an electron beam gun 12 contained in a sealed container or vacuum chamber 50 capable of maintaining a controlled atmosphere. The controlled atmosphere can comprise a vacuum or a suitable gas or mixtures of gasses. The gun 12, part of which can be positioned outside of the chamber 50 for access and electrical connectivity, is adapted to generate and transmit an electron beam 14 within the controlled atmosphere, and to direct the beam toward a substrate 20. In the embodiment of FIG. 1, the substrate 20 is positioned on a moveable platform 21. Alternately, the gun 12 can be completely enclosed within chamber 50 so that the gun is also moved rather than just the substrate 20. In either embodiment, the gun 12 moves relative to the substrate 20. It will be understood that the processes herein can, when discussing relative movement, simply refer to movement of the gun in the written description and/or claims. This movement, unless expressly stated otherwise, can actually comprise movement of both the gun and the substrate 20, or movement of only the gun or substrate.

The platform 21 and/or the gun 12 may be movable via a multi-axis positioning drive system 25, which is shown schematically as a box in FIG. 1 for simplicity. A complex or three-dimensional (3D) object is formed by progressively forming and cooling a metal deposit in the form of a molten pool 24 into layers 29 on the substrate 20. Metal deposit 24 is initially in the form of a molten pool that is formed by beam-melting of consumable wire 18, e.g., a suitable metal such as aluminum or titanium, which is fed toward the molten pool from a wire feeder 16. The term "metal deposit" is used herein if the metal is in a solid state, and the term "molten pool" is used herein if the metal is in a liquid state. Wire feeder 16 can comprise a spool or other suitable delivery mechanism having a controllable wire feed rate or speed. While not shown in FIG. 1 for simplicity, chamber 50 can be evacuated using a vacuum subsystem such as a turbo-molecular pump, a scroll pump, an ion pump, ducts, valves, etc., as understood in the art.

The apparatus 10 also includes a closed-loop controller (C) 22 having a host machine 27 and an algorithm(s) 100 adapted for controlling an $EBF^3$ process conducted using the apparatus. Controller 22 is electrically connected to or in communication with a main process controller (Cm) 30 which, as understood in the art, is adapted for sending necessary commands to the gun 12, the wire feeder 16, and any required motors (not shown) that position the substrate 20 and the gun. The commands include a set of final control parameters 11F. The controller 22 generates and transmits a set of input parameters 11 that modifies the final control parameters 11F.

The wire 18, when melted by the electron beam 14, e.g., to over approximately 3000° F. in one embodiment, is accurately and progressively deposited, layer upon layer, according to a set of design data 19, e.g., Computer Aided Design (CAD) data or another 3D design file. In this manner, a 3D structural part or other complex object can be created in an additive manner without the need for a casting die or mold. This provides for rapid prototyping and hands-free manufacturing of vehicle, airplane, spacecraft, and/or other complex components or parts.

In order to achieve closed-loop $EBF^3$ process control, the closed-loop controller 22 of FIG. 1 can be electrically connected to one or more sensors (S) 15 to detect or measure one or more specific features of interest of the molten pool 24, with the information describing the feature of interest relayed to the controller 22 as a sot of sensor data 13. Host machine 27 receives the sensor data 13 and runs one or more algorithms, represented collectively as the algorithm 100 in FIGS. 1 and 2, to interpret the sensor data. The controller 22 signals the main process controller 30 to modify the final control parameters 11F for the $EBF^3$ process as needed. For example, the controller 22 can signal the main controller 30 to alter a feed rate of the wire feeder 16, a power value of the gun 12, a speed of the moveable platform 21, and/or any other components of the apparatus 10.

Host machine 27 can comprise a desktop computer equipped with a basic data acquisition and analysis software environment, e.g., Lab View® software, and high speed data acquisition boards for real-time acquisition and analysis of large volumes of data associated with high speed data images. The host machine 27 can include sufficient read only memory (ROM), random access memory (RAM), electrically-erasable programmable read only memory (EEPROM), etc., of a size and speed sufficient for executing the algorithm 100 as set forth below. The host machine 27 can also be configured or equipped with other required computer hardware, such as a high speed clock, analog-to-digital (A/D) and digital-to-analog (D/A) circuitry, input/output circuitry and devices (I/O), as well as appropriate signal conditioning and/or buffer circuitry. Any algorithms resident in the host machine 27 or accessible thereby, including the algorithm 100 as described below, can be stored in memory and automatically executed to provide the respective functionality.

Algorithm 100 is executed by the host machine 27 to interpret the sensor data 13, and to assess the magnitude and speed of any changes occurring during the $EBF^3$ process. As discussed in more detail in the Taminger '410 patent publication, a closed feedback loop is formed between the controller 22, working with the main process controller 30 and the controlled $EBF^3$ system components, e.g., the electron gun 12, wire feeder 16, etc., to allow for a real-time modification to the final control parameters 11F.

The features of interest to be monitored during the $EBF^3$ process are measured/determined by the sensors 15. Sensors 15 can comprise a charge-coupled device (CCD)-equipped camera adapted to convert an image of the process region (arrow A) into a digital signal suitable for processing by the host machine 27. Sensors 15 can also include a Complementary Metal-Oxide Semiconductor (CMOS)-based camera used to visually monitor the $EBF^3$ process with relatively low noise/low power consumption. Sensors 15 can use a CCD-equipped camera in conjunction with an infrared (IR) band-pass filter(s) to thermally image the EBF³ process. A secondary electron detector can also be used as or with one of the sensors 15 to further visually monitor the EBF³ process.

As shown in FIG. 1, at least one of the sensors 15 can be mounted outside of the vacuum chamber 50, e.g., when a fixed-gun system is used. As will be understood by those of ordinary skill in the art, in a fixed-gun system all motion occurs on the deposited part such that the deposition process always occurs in the same spot, thereby enabling installation of a sensor 15 in the form of a fixed camera at a position outside of the vacuum chamber 50. A sensor 15 configured and positioned as described can be used to monitor, for example, a height of any deposited material or bead of the molten pool 24, and/or a distance between the molten pool and the wire feeder 16.

Sensors 15 equipped as digital cameras having CCD capability can be installed in several different orientations inside the process chamber 50, with the digital cameras being focused on the process zone as indicated by arrow A. A CMOS-equipped camera can be installed outside of the vacuum chamber of gun 12, and a fiber optic cable (not shown) or other communications conduit can be used to transmit images from within the vacuum chamber to the CMOS camera. These cameras can be used to image bead shape and height during formation of the molten pool 24, a location of the wire 18 relative to the molten pool, and melt pool shape and area as determined by examining the change in reflectance between the molten and solid material.

IR band-pass filters may also be installed on sensors 15 configured as CCD-equipped or CMOS-equipped digital cameras in order to examine a temperature of the molten pool 24 and the surrounding region. A secondary electron detector as noted above can be installed and adapted to use electrons from the electron beam 14 to image the EBF³ process in real-time. Electrons reflected off wire 18 and the molten pool 24 can be pulled into a sensor 15 adapted as such a secondary electron detector to provide an image of anything that the incident electron beam encounters. A raster pattern of the electron beam 14 can be automatically modified to expand the imaging field. It will be understood that various imaging devices can be utilized, and the present invention is therefore not limited to specific imaging devices, CCD and CMOS.

As discussed above, during known prior EBF³ processes, a human operator sets the height of the electron beam gun relative to the substrate. One problem with this approach is that for deposition consistency from layer to layer, the working height should stay within a known "good" range. Although the height of the electron beam gun relative to the substrate can be measured utilizing known sensors, variations in the thickness of the layers of material and variations in the thickness of the pool of material create difficulties with respect to accurately determining the distance between the electron gun and the surface of the molten pool. Still further, a lack of automation can lead to increased operator work-load and training. Also, a lack of automation typically prevents an operator from leaving the process unattended in an industrial setting.

Figure 2:
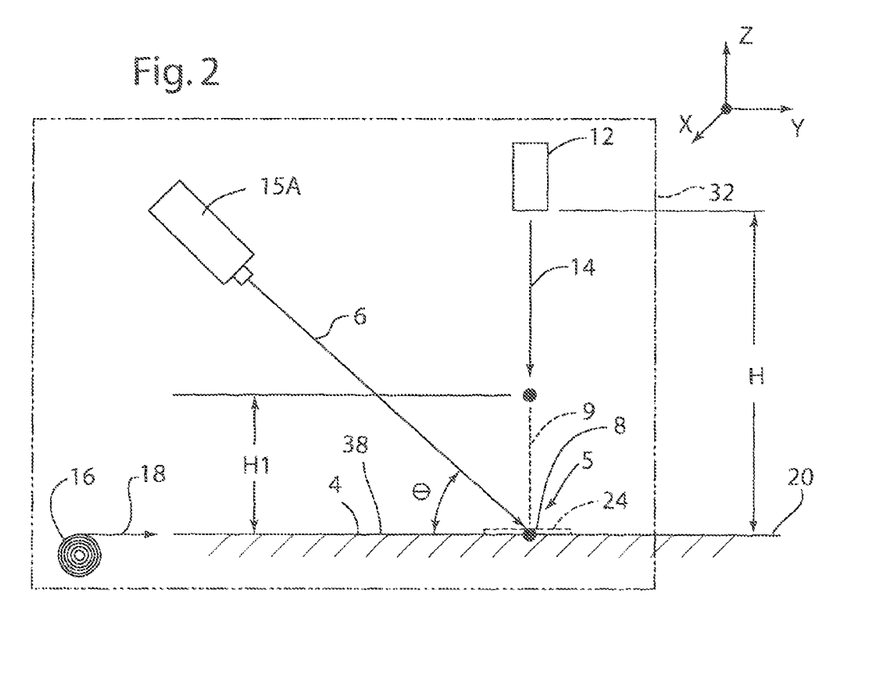
FIG. 2 is a schematic view of a portion of the EBF$^3$ apparatus of FIG. 1.
Figure 3:
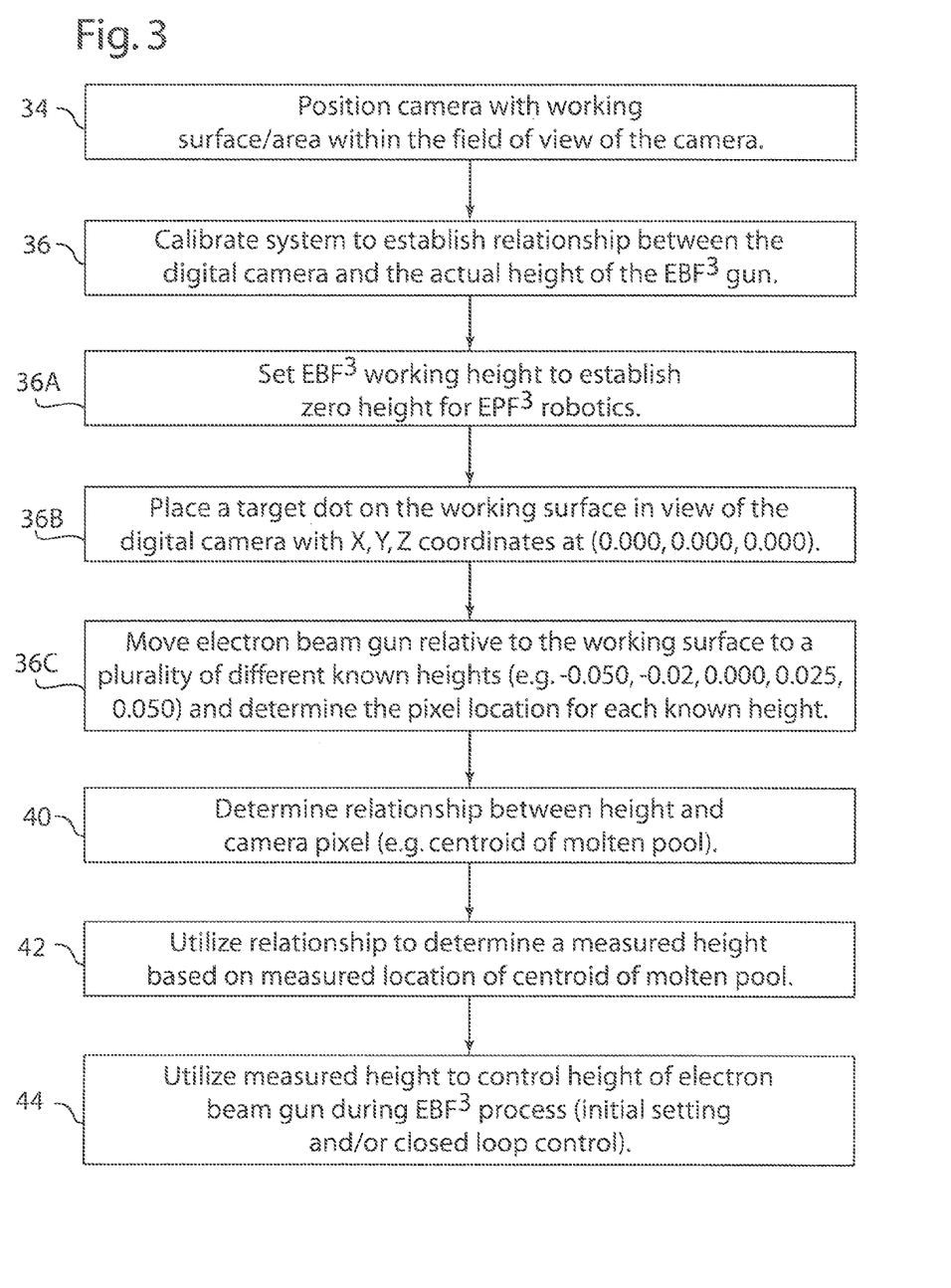
FIG. 3 is a flow chart showing a process/method of height control in an EBF$^3$ process according to another aspect of the present disclosure.

Automation of the height control aspect of the process can be accomplished utilizing a video camera 15A (FIG. 2), image processing, and communication with the EBF³'s control system described above. With further reference to FIG. 3, camera 15A is initially positioned with the worksurface area 5 within the field of view of camera 15A as shown at 34 in FIG. 3. In general, the worksurface area 5 comprises the area on substrate 20 within which the molten pool of material 24 is formed. The line of sight 6 of camera 15A forms an angle θ relative to substrate 20. The angle θ remains constant as the vertical position of substrate 20 is changed/adjusted. A structure 32 interconnects the electron beam gun 12, camera 15A and wire feeder 16, such that the positions of the electron beam gun 12, camera 15A, and wire feeder 16 do not change relative to one another. After the camera 15A is positioned, a calibration step 36 is performed to establish the relationship between the camera 15A and the working height "H", which is the distance between the EBF³ gun 12 and the working surface or substrate 20. A target dot 8 will appear to move in the camera's field of view as the working height is varied as designated "H1." This is due to the angle θ of the line of sight 6 of camera 15A. The angle θ need not be measured utilizing the procedure of the present invention.

Calibrating the system includes setting the EBF³ working height H, and establishing this as the zero height for the EBF³ robotics at step 36A. Once the zero height is established, a line 9 representing the electron beam 14 intersects a line 4 of wire 18 along substrate 20 and the plane 38 of worksurface or substrate 20. Once the zero height is established, a target dot 8 is placed in the view of the camera 15A. The dot is initially positioned at the X, Y, Z coordinates of [0.000, 0.000, 0.000]. For a 5-point calibration the working height may be set to −0.050, −0.025, 0.000, 0.025, and 0.050 inches at step 36B. It will be understood that these are example heights, and a broader or narrower range or different numbers of calibration points may be acceptable.

The change of location of the target dot 8 can be utilized to develop a mathematical relationship between the pixel location verses the height of the camera. The pixel location of the target dot 8 will change on the Y-axis of the camera image as the camera 15A changes location vertically as shown by the dimension "H1" of FIG. 2. A plot of the pixel location verses the height of the camera 15A results in a straight line representing the pixels per inch. Later, during the deposition process, the centroid of the molten pool 24 can be used to estimate an error from the ideal build height. For example, if the pixel location verses the height of the camera results in an equation of the form y=mx+b, the constant "m" can be determined from the line correlating pixel location verses height of the camera (i.e. m=y/x if b=0). The measured height will then be equal to y/m, when y is equal to the centroid of the molten pool 24. From this, an error correction may be generated and sent to the EBF³ system to alter the working height H. Since the molten pool 24 has a thickness, the ideal working height can be an offset from what has been calibrated as 0.000 inches.

Also, since the height H is controlled and monitored by the control system, it is possible to predict the height setting at which to start the next layer of deposition. This should be an offset value that will depend on the material being deposited and at the rate at which the material is deposited. Wire feed rate, travel speed, and electron beam energy will typically affect the thickness of the deposition. In a similar fashion, an array of target dots can be printed on a target in a square grid pattern of known size. The pattern of dots will displace on the Y-axis in the camera view as the working height H is changed. At each measurement height, similar to the straight-line pixels/height above, a correction factor can be computed for each square in the camera's view, and a calibration table can be constructed.

It can be that for small changes in height the areal correction is too small to be relevant. Thus, the technique is possible, but it may not be necessary in every case.

In addition to measurement of a working height of electron beam gun 12 relative to a molten pool 24 to provide closed loop control of the EBF³ process, the present invention also provides for use of electron beam gun 12 to measure the height of a solid (cooled) metal deposit 24. This eliminates the need for a separate laser-based height measurement system (not shown) as used in known systems/processes. In existing systems, the deposition height of a solid metal deposit 24 can be measured utilizing a separate point laser system. In these existing systems, the measuring unit shines a point of laser light at the target and a sensor in the unit receives the reflected light. Triangulation is used to estimate the distance from the sensor to the reflecting target. This type of laser-based system works well to measure the height of an aluminum deposit because the surface finish of the aluminum is reflective but not shiny. However, titanium has a very shiny surface and laser systems may not provide accurate measurements. In some laser measurement applications, a powder is applied to the shiny surface to reflect a suitable image of the laser dot. However, in the EBF³ system described above, use of powder is not a viable option due to difficulty involved in applying the powder in the vacuum systems. Also, the powder can have a negative effect on the next deposit layer.

To measure the height of a solid metal deposit 24, electron beam 14 is set to a low power level that produces a visible dot on metal deposit 24 without melting deposit 24. The calibration curve (e.g. straight line of a form y=mx+b) discussed above can then be used to estimate or measure the height. For this type of measurement, the electron beam 14 is energized just enough to create a hotspot on the target that is bright enough for the camera 15A to capture accurately. This results in more energy entering the metal deposit 24. Excessively high beam energy could alter the desired mechanical properties. However, once the minimum power settings and/or beam focus settings are established, this method is suitable for any metal target. Use of the electron beam gun 12 to measure the height of solid metal deposits eliminates the need for a separate laser-based height measurement system.

In addition to the "single point" height measurement of a metal deposit 24 described above, the camera 15A can also be utilized to measure a plurality of heights along a line to thereby measure a surface contour line 52 (FIG. 4) of a metal deposit 24 that has been formed on a substrate. A plurality of 2D surface contour lines 52 can be measured to thereby determine a 3D contour of the surface of a metal deposit 24. As discussed in more detail below, measuring the surface contour line 52 of a metal deposit 24 involves generating a low power beam 14 that is deflected in an oscillating manner such that a line is projected on the substrate. It will be understood that existing electron beam guns 12 include beam deflection features that permit control of the direction of electron beam 14. During measurements and/or calibration, electron beam gun 12 can be adjusted to provide a low power beam that generates a visible spot on the target surface that can be captured in a digital image by camera 15A (FIG. 2) without transferring significant amounts of energy into the target surface.

Figure 4:
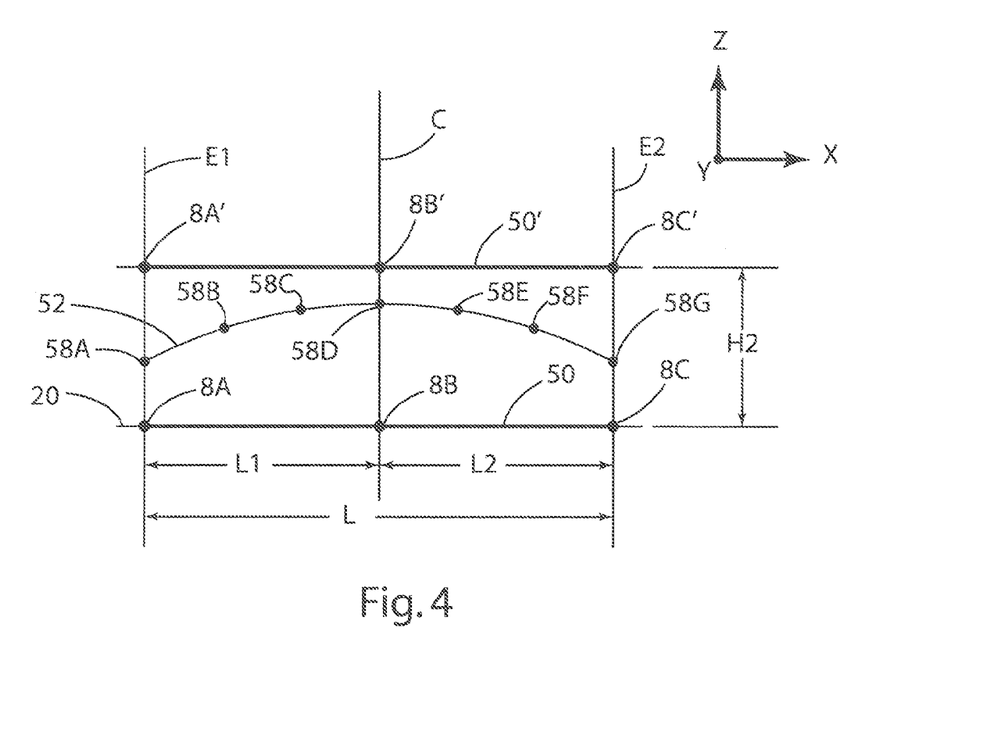
FIG. 4 is a schematic view of a 2 or 3 dimensional height measurement/calibration system or method.

2D calibration can be accomplished by positioning three dots 8A, 8B, and 8C on substrate 20. The dots 8A, 8B, and 8C can comprise black dots positioned on a white sheet of paper or other planar substrate. It will be understood that the line 50 does not necessarily need to be drawn on the sheet of paper, and line 50 is shown in FIG. 4 for discussion purposes. In general, the electron beam gun 12 can deflect the beam 14 to travel along a line that is on the order of 0.5 inches to as long as 2.0 inches. These dimensions are examples of the capability of known electron beam guns 12. However, the present disclosure is not limited to these specific examples. The dots 8A, 8B, and 8C are positioned such that the line 50 is parallel to the X axis of the system (see also FIG. 2). Dot 8B is located between dots 8A and 8C, and dots 8A and 8B are spaced from dot 8A by distances "L1" and "L2", respectively. The distances L1 and L2 are preferably equal to one another such that dot 8B is centered between dots 8A and 8C. The distance between the dots 8A and 8C is "L", in general, the length L is selected to correspond to the maximum deflection angle of electron beam 14 that can be generated by electron beam gun 12. The center dot 8B is positioned such that it is directly at a point where a non-deflected beam 14 would pass. With the electron beam gun 12 set to its normal working distance H (FIG. 2), this point is at the Z=0 plane in the coordinate system of the apparatus 10. As discussed above, the dots 8A, 8B, and 8C are parallel to the axis X. The line 50 is therefore perpendicular to the line of sight 6 of camera 15A (FIG. 2).

The 2D calibration of points 8A, 8B, and 8C is similar to the "1D" calibration procedure discussed above in connection with FIGS. 2 and 3. The working height H is established as the zero height for the EBF³ robotics as shown at step 36A (FIG. 3). Dot 8B is initially at the X, Y, Z coordinates of [0.000, 0.000, 0.000]. The lengths of the lines L1 and L2 are known, such that the dot 8A is initially at the XYZ coordinates of [−L1, 0.000, 0.000], and dot 8C is initially at the XYZ coordinates of [L2, 0,000, 0.000]. The electron beam gun 12 is then moved through a series of predefined working heights (e.g. −0.050, −0.025, 0.000, 0.025, and 0.050, as discussed above) relative to the substrate 20. As the height of the camera 15A changes relative to the substrate 20, the digital images (pixels) 8A', 8B', and 8C' of dots 8A, 8B, and 8C, respectively, change positions by an amount "H2". The dimension H2 in FIG. 4 corresponds to the Y axis of the camera image. At each height setting the positions of the dots 8A, 8B, and 8C are recorded by imaging software.

Two calibrations can be computed from these images. First, a relationship between the positions of the images 8A', 8B', and 8C' to an actual height is determined. For example, the actual heights of the points 8A, 8B, and 8C relative to the positions of the images 8A', 8B', and 8C' can be in the form of an equation y=mx+b. Once the relationship (e.g. an equation y=mx+b) between the actual heights and the positions of the images is determined, the positions of images 8A', 8B', and 8C' can be utilized to calculate a measured vertical position of points on a surface of metal deposit 24 in use. During measuring operations the electron beam gun 12 can be set to a low power setting that does not introduce significant energy levels into metal deposit 24, and the electron beam 14 can be oscillated to provide a plurality of images (i.e. pixels) along line 50.

It will be understood that additional dots can be positioned between the dots 8A, 8B, and 8C during the calibration process such that, a relationship between the image location and actual height can be determined for a large number of points along line 0. Thus, in use, the heights at a large number of positions 58A-58G along a surface contour line 50 can be measured/determined in use. A best fit line can then be calculated to provide a surface contour line 52 of the metal deposit 24 at a specific Y coordinate. Additional measurements can be taken at a plurality of Y positions to provide additional surface contour lines 52 of the metal deposit 24.

In addition to the height calibrations and measurements discussed above, a second calibration and measurement can be utilized to determine the lateral locations of the positions/dots 58A-58G on a surface contour line 52. The lateral locations of the positions/dots or 58A-58G can be determined relative to a center line C passing through the center location (point 8B). Determining the lateral locations of the points 58A-58G requires a second calibration. As discussed above, the dots 8A, 8B, and 8C can be moved to a plurality of known heights, and the relationship between the changes in position in the camera image and the heights can be determined. Using the image taken at the Z=0.0 position, the number of pixels between the dots 8A and 8C and the center dot 8B in the camera image can be counted. The distances L1 and L2 are known, and these distances can be divided by the number of pixels in the distances to establish a relationship between the observed pixel location in the camera image and a physical location on the target or substrate. The number of pixels in each image corresponding to the calibration heights can be utilized to provide a relationship between the number of pixels and the lengths L1 and L2 at each calibration height. Additional dots (not shown) between dots 8A-8C can be utilized during the calibration process to establish a relationship between the image locations and the lateral positions of the additional dots. These calibration points can then be utilized to determine the distances from centerline C to positions 58B-58F on surface contour line 52.

Alternately, calibration for the points 58B-58F can be estimated from the calibration relationship for the outer points 8A and 8C. For example, if points 58A-58D are equally spaced apart, the lateral distances between points 58A and 58B will be L1/3, the distance between points 58B and 58C will also be L1/3, and the lateral distance between points 58C and 58D will also be L1/3. As discussed above, the length L1 is divided by the number of pixels N to establish a relationship between the observed pixel location in the camera image and a physical location. For the point 8A, at a given calibration height this relationship would be L1/N. For the point 58B, the estimated lateral distance relationship would be 2(L1)/3N, and the estimated relationship for the point 58C would be L1/3N.

In use, capturing a profile line 52 is a 2D measurement. 3D topography can be measured by moving the line resulting from oscillation of beam 14 around the metal deposit 24 and the component that is being formed utilizing the $EBF^3$ process.

As discussed above, the calibration can be conducted at a plurality of discreet heights, both negative and positive, about a 0.000 working height. In use, measurements are preferably made as close as possible to the 0.000 working height. For example, a first bead or layer can be deposited and measured as the system is moved in the Z=0.000 plane. Measurements from the image processing will be relative to the initial substrate, and therefore need no adjustment. If the first layer has a height of 0.025 inches, then the second deposit or layer would be measured as the robotics travel in the Z=0.025 inches plane. Measurements from the imaging system will then have 0.025 inches added to them to account for the Z displacement of the robotic system.

Since the camera 15A (FIG. 2) is at an angle θ relative to the plane of the part being built, there may be a shadow area that the camera 15A cannot image, and the heights in the shadow area cannot therefore be measured. Accordingly, the substrate 20 is preferably rotatable about the Z axis, or the camera 15A can be rotatable about the part being made. The camera 15A can thereby generate images that can be utilized to measure the contours/heights of the component in the areas that would otherwise not be imagable by camera 15A.

Although the system has been described as having a single camera 15A, an additional camera 15A can be positioned on an opposite side of electron beam gun 12, and stereoscopic methods can be utilized to make height measurements. Additional cameras 15A could also be positioned about the component/molten pool/metal deposit 24 to provide for more accurate or more detailed measurements. For example, with reference to FIG. 2, cameras 15A could be positioned at locations along the Y axis, and at a −Y axis location, and cameras 15A could also be positioned along the +X axis and the −X axis.

It is to be understood that variations and modifications can be made on the aforementioned structure and process without departing from the concepts of the present disclosure, and further it is to be understood that such concepts are intended to be covered by the following claims unless these claims by their language expressly state otherwise.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "some embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of controlling a measured actual height of an EBF³ electron beam gun and wire feeder during deposition of layers of molten matter onto a substrate, the EBF³ method comprising:
providing a substrate;
providing a wire source through a wire feeder;
positioning an EBF³ electron beam gun and wire source in the vicinity of the substrate;
positioning a video camera at a fixed position relative to the EBF³ electron beam gun;
calibrating the video camera by calculating a constant slope correlating pixel location of a first digital image from the video camera to a height of the EBF³ electron beam gun;
forming a molten pool of material on the substrate by melting the wire source utilizing the EBF³ electron beam gun, the molten pool having a surface defining a measured actual height relative to the EBF³ electron beam gun;
depositing layers of molten matter of the wire source melted by the EBF³ electron beam gun;
utilizing the video camera to generate a second digital image of at least a portion of the molten pool of material;
determining a range of acceptable actual heights of the electron beam gun relative to the surface of the molten pool;
determining a measured actual height of the EBF³ electron beam gun relative to the surface of the molten pool by calculating a product of: a pixel location of a centroid of the molten pool on the second digital image, and the calculated constant slope;
controlling the height of the EBF³ electron beam gun based on the measured actual height of the EBF³ electron beam gun relative to me surface of the molten pool to provide automated control of the EBF³ method; and
ensuring that the measured height is within the range of acceptable heights of the electron beam gun relative to the surface of the molten pool.

2. The method of claim 1, wherein the calibrating the video camera further comprises: generating data relating digital images generated by the video camera to a distance of the EBF³ electron beam gun from the surface of the molten pool.

3. The method of claim 2, wherein the calibrating the video camera further comprises: providing a position sensor that outputs sensor positions concerning a height of the EBF³ electron gun relative to the substrate.

4. The method of claim 3, wherein the calibrating the video camera further comprises:
positioning a target on the substrate within a line of sight of the video camera;
setting the height of the EBF³ electron beam gun relative to the substrate at a plurality of sensor positions;
utilizing the video camera to generate digital image locations corresponding to each sensor position.

5. The method of claim 4, further comprising:
determining a relationship between the sensor positions and the image locations such that a measured actual height of the EBF³ electron gun relative to the substrate can be determined from a digital image location generated by the video camera.

6. The method of claim 4, further comprising:
forming a database comprising pairs of data, wherein a first number of each pair represents sensor position of the EBF³ electron beam gun relative to the substrate, and wherein a second number of each pair represents a digital image location generated by the video camera.

7. The method of claim 1, further comprising:
allowing the molten pool to solidify to form a metal deposit;
causing the EBF³ electron beam gun to generate a beam of electrons that are incident on the surface of the metal deposit to illuminate a region of the surface of the metal deposit;
causing the electron beam to move to illuminate a plurality of regions of the surface of the metal deposit;
determining the height of the regions utilizing digital images formed by the video camera.

8. A method of measuring a position of a metal surface relative to an EBF³ electron beam gun; the EBF³ method comprising:
providing a substrate and an EBF³ electron beam gun that is movable relative to the substrate;
positioning a video camera at a fixed position relative to the EBF³ electron beam gun;
utilizing the video camera to generate images;
calibrating the video camera by calculating a constant slope correlating pixel location of a first digital image, from the generated images, to a height of the EBF³ electron beam gun from the substrate:
forming a metal surface;
utilizing the EBF ³ electron beam gun to illuminate a region of the metal surface;
utilizing the video camera to generate a second digital image of the illuminated region of the metal surface;
utilizing the second digital image of the illuminated region of the metal surface to determine a measured actual position of the metal surface relative to the EBF³ electron beam gun by calculating a product of: a pixel location of the illuminated region of the metal surface on the second digital image, and the calculated constant slope to provide automated control of the EBF³ method.

9. The method of claim 8, wherein:
forming a metal surface includes utilizing the EBF³ electron beam gun to form a molten pool of metal having a metal surface.

10. the method of claim 9, wherein:
the images of the metal surface are generated while the metal is in a molten state.

11. The method of claim 9, further comprising:
solidifying the molten pool of metal; and
wherein the images of the metal surface are generated after the molten metal has solidified.

12. The method of claim 11, wherein:
the metal defines material properties upon solidification of the molten metal;
the EBF³ electron beam gun is controlled to generate an electron beam having, sufficient power to illuminate a region of the metal surface of the solidified metal and generate a video camera image of the illuminated region without significantly altering the material properties of the solidified metal.

13. The method of claim 12, further comprising:
causing the electron beam to illuminate a plurality of adjacent regions of the surface of the metal;
utilizing the camera to generate one or more images of the adjacent regions;
determining a shape of the surface of the metal utilizing the images.

14. The method of claim 13, further comprising:
  determining a three dimensional shape of the surface of the metal by determining three dimensional locations of a plurality of points on the metal surface utilizing the illuminated regions of the images.

\* \* \* \* \*

UNITED STATES PATENT AND TRADEMARK OFFICE
CERTIFICATE OF CORRECTION

PATENT NO. : 9,764,415 B2  
APPLICATION NO. : 13/834294  
DATED : September 19, 2017  
INVENTOR(S) : William J. Seufzer and Robert A. Hafley Page 1 of 1

It is certified that error appears in the above-identified patent and that said Letters Patent is hereby corrected as shown below:

In the Claims

--In Column 11 Line 36 in Claim 1, change "me" to "the"--

Signed and Sealed this
Twenty-seventh Day of March, 2018

Andrei Iancu
*Director of the United States Patent and Trademark Office*